US009317718B1

(12) United States Patent
Takahashi

(10) Patent No.: US 9,317,718 B1
(45) Date of Patent: Apr. 19, 2016

(54) SECURITY DEVICE WITH PROGRAMMABLE SYSTOLIC-MATRIX CRYPTOGRAPHIC MODULE AND PROGRAMMABLE INPUT/OUTPUT INTERFACE

(71) Applicant: Securion Systems, Inc., Clearfield, UT (US)

(72) Inventor: Richard J. Takahashi, Layton, UT (US)

(73) Assignee: Securion Systems, Inc., Clearfield, UT (US)

( * ) Notice: Subject to any disclaimer, the term of this patent is extended or adjusted under 35 U.S.C. 154(b) by 0 days.

(21) Appl. No.: 14/177,392

(22) Filed: Feb. 11, 2014

Related U.S. Application Data

(60) Provisional application No. 61/806,676, filed on Mar. 29, 2013.

(51) Int. Cl.
*G06F 21/71* (2013.01)

(52) U.S. Cl.
CPC ..................................... *G06F 21/71* (2013.01)

(58) Field of Classification Search
None
See application file for complete search history.

(56) References Cited

U.S. PATENT DOCUMENTS

| | | | |
|---|---|---|---|
| 5,961,626 A | 10/1999 | Harrison et al. | |
| 6,044,388 A | 3/2000 | DeBellis et al. | |
| 6,081,895 A | 6/2000 | Harrison et al. | |
| 6,101,255 A | 8/2000 | Harrison et al. | |
| 6,304,973 B1 | 10/2001 | Williams | |
| 6,550,012 B1 | 4/2003 | Villa et al. | |
| 6,577,734 B1 | 6/2003 | Etzel et al. | |
| 6,598,161 B1 | 7/2003 | Kluttz et al. | |
| 6,845,446 B1 * | 1/2005 | Fuller | 713/153 |
| 7,200,756 B2 | 4/2007 | Griffin et al. | |
| 7,921,288 B1 | 4/2011 | Hildebrand | |
| 8,073,949 B2 | 12/2011 | Cunchon et al. | |
| 8,166,289 B2 | 4/2012 | Owens et al. | |
| 8,234,686 B2 | 7/2012 | Alvermann et al. | |
| 8,289,975 B2 | 10/2012 | Suganthi et al. | |
| 8,418,252 B2 | 4/2013 | Akyol et al. | |
| 8,433,783 B2 | 4/2013 | Jackowski et al. | |
| 8,433,929 B2 | 4/2013 | Yamashita | |
| 8,438,626 B2 | 5/2013 | Anderson et al. | |
| 8,443,069 B2 | 5/2013 | Bagepalli et al. | |

(Continued)

OTHER PUBLICATIONS

U.S. Appl. No. 14/198,097, filed Mar. 5, 2014, entitled "Multi-Level Independent Security Architecture," by Richard J. Takahashi.

(Continued)

*Primary Examiner* — David Pearson
(74) *Attorney, Agent, or Firm* — Greenberg Traurig, LLP

(57) ABSTRACT

A system includes programmable systolic cryptographic modules for security processing of packets from a data source. A first programmable input/output interface routes each incoming packet to one of the systolic cryptographic modules for encryption processing. A second programmable input/output interface routes the encrypted packets from the one systolic cryptographic module to a common data storage. In one embodiment, the first programmable input/output interface is coupled to an interchangeable physical interface that receives the incoming packets from the data source. In another embodiment, each cryptographic module includes a programmable systolic packet input engine, a programmable cryptographic engine, and a programmable systolic packet output engine, each configured as a systolic array (e.g., using FPGAs) for data processing.

18 Claims, 8 Drawing Sheets

(56) References Cited

U.S. PATENT DOCUMENTS

| | | |
|---|---|---|
| 8,479,304 B1 | 7/2013 | Clifford |
| 2002/0091975 A1 | 7/2002 | Redlich et al. |
| 2002/0099959 A1 | 7/2002 | Redlich et al. |
| 2002/0165961 A1 | 11/2002 | Everdell et al. |
| 2003/0012373 A1 | 1/2003 | Ogura et al. |
| 2003/0014627 A1* | 1/2003 | Krishna et al. ............... 713/153 |
| 2003/0051054 A1 | 3/2003 | Redlich et al. |
| 2003/0070077 A1 | 4/2003 | Redlich et al. |
| 2003/0119484 A1 | 6/2003 | Adachi et al. |
| 2003/0120949 A1 | 6/2003 | Redlich et al. |
| 2003/0172279 A1 | 9/2003 | Yudasaka |
| 2003/0182435 A1 | 9/2003 | Redlich et al. |
| 2003/0196108 A1 | 10/2003 | Kung |
| 2004/0054914 A1 | 3/2004 | Sullivan |
| 2005/0132070 A1 | 6/2005 | Redlich et al. |
| 2005/0138109 A1 | 6/2005 | Redlich et al. |
| 2005/0138110 A1 | 6/2005 | Redlich et al. |
| 2005/0198412 A1 | 9/2005 | Pedersen et al. |
| 2006/0059537 A1 | 3/2006 | Alvermann et al. |
| 2006/0149965 A1 | 7/2006 | Sharma |
| 2006/0174102 A1 | 8/2006 | Smith et al. |
| 2007/0067634 A1 | 3/2007 | Siegler |
| 2007/0192596 A1 | 8/2007 | Otsuka |
| 2007/0195951 A1* | 8/2007 | Leung, Jr. ................... 380/37 |
| 2007/0204159 A1 | 8/2007 | Hara |
| 2008/0062803 A1* | 3/2008 | Fronte et al. ............ 365/230.03 |
| 2008/0168135 A1 | 7/2008 | Redlich et al. |
| 2009/0178144 A1 | 7/2009 | Redlich et al. |
| 2009/0254572 A1 | 10/2009 | Redlich et al. |
| 2009/0327617 A1 | 12/2009 | Furuichi et al. |
| 2010/0010968 A1 | 1/2010 | Redlich et al. |
| 2010/0115260 A1 | 5/2010 | Venkatesan et al. |
| 2010/0198730 A1 | 8/2010 | Ahmed et al. |
| 2010/0250497 A1 | 9/2010 | Redlich et al. |
| 2010/0278338 A1 | 11/2010 | Chang et al. |
| 2012/0066509 A1 | 3/2012 | Lapp et al. |
| 2012/0110316 A1* | 5/2012 | Chamberlain et al. ........ 713/100 |
| 2012/0159183 A1 | 6/2012 | Adams et al. |
| 2012/0213360 A1 | 8/2012 | Le Quere |
| 2013/0077788 A1 | 3/2013 | Blanchard et al. |
| 2014/0013123 A1 | 1/2014 | Khazan et al. |
| 2014/0108782 A1* | 4/2014 | Salinger et al. ............... 713/155 |
| 2014/0122866 A1 | 5/2014 | Haeger et al. |
| 2014/0324698 A1 | 10/2014 | Dolcino et al. |

OTHER PUBLICATIONS

U.S. Appl. No. 14/208,337, filed Mar. 13, 2014, entitled "Multi-Tenancy Architecture," by Richard J. Takahashi.

U.S. Appl. No. 14/217,912, filed Mar. 18, 2014, entitled "Removable or Replaceable Physical Interface Input/Output Module," by Richard J. Takahashi.

U.S. Appl. No. 14/219,651, filed Mar. 19, 2014, entitled "Secure End-To-End Communication System," by Richard J. Takahashi.

* cited by examiner

US 9,317,718 B1

SECURITY DEVICE WITH PROGRAMMABLE SYSTOLIC-MATRIX CRYPTOGRAPHIC MODULE AND PROGRAMMABLE INPUT/OUTPUT INTERFACE

RELATED APPLICATIONS

This application claims priority to U.S. Provisional Application Ser. No. 61/806,676, filed Mar. 29, 2013, entitled "PROGRAMMABLE CRYPTO AND PACKET WITH SECURE BOOT," by Richard J. Takahashi, the entire contents of which application is incorporated by reference as if fully set forth herein.

FIELD OF THE TECHNOLOGY

At least some embodiments disclosed herein relate to security processing in general, and more particularly, but not limited to, security processing of data using programmable cryptographic modules.

BACKGROUND

Today's stored data (e.g., cloud data storage, data storage farms and networks), in general, is unsecure and accessible to unwanted intruders. Current IT network security solutions consist of layering security products to protect a given network. These products typically consist of firewalls, intrusion detection and prevention systems, security analytics, malware software, access controls, etc., and yet daily intrusions remain as an on-going problem.

One problem is that firewalls, intrusion detection systems (IDSs), intrusion prevention systems (IPSs), security analytics, and malware products can only detect "known" attacks. Firewalls, IDS/IPS, and malware products are deterministic search and analytics engines designed find pattern matching, signatures of known attacks, and viruses. Firewalls, IDS/IPS, and malware products are designed to prevent "known" attacks and general access, denial or disruption attacks, for data in transit, but are not designed for securing data at rest (i.e., data stored in large storage area networks (SAN)). They cannot detect or stop new attacks, malware or virus or variants. Etc. Therefore new attacks can be embedded undetected into the network and the data-at-rest storage area. In the world of insider and external attackers, emerging government regulations to protect user information, and growth of cloud computing and storage, there is a need to protect stored data in large-scaled storage systems.

In addition, countries around the world suffer losses with billions of dollars a year being stolen, or copied, because it is difficult to protect stored data. For example, many companies have lost billions of dollars worth of intellectual property, and customer's personal and financial information, in the last year, and spent hundreds of millions of dollars repairing damage from data breaches.

SUMMARY OF THE DESCRIPTION

Systems and methods to provide security processing for incoming data (e.g., packets) via a security device are described herein. Some embodiments are summarized in this section.

In one embodiment, a system includes a plurality of cryptographic modules; a first programmable input/output interface configured to route each of a plurality of incoming packets to one of the cryptographic modules for encryption to provide a plurality of encrypted packets; and a second programmable input/output interface configured to route the encrypted packets to a common internal or external data storage.

In one embodiment, a system includes programmable systolic cryptographic modules for security processing of packets from a data source. A first programmable input/output interface routes each incoming packet to one of the cryptographic modules for encryption processing. A second programmable input/output interface routes the encrypted packets from the one cryptographic module to a common data storage. In one embodiment, the first programmable input/output interface is coupled to an interchangeable physical interface that receives the incoming packets from the data source. In another embodiment, each systolic cryptographic module includes a programmable packet input engine, a programmable cryptographic engine, and a programmable packet output engine, each configured as a systolic-matrix array (e.g., using FPGAs) for security processing of the input and output data packets.

In one embodiment, a method includes receiving, by an interchangeable physical interface, a plurality of incoming packets from a data source; routing, by a first programmable input/output interface coupled to the interchangeable physical interface, the plurality of incoming packets to a first module of a plurality of cryptographic modules; encrypting the incoming packets using the first module to provide a plurality of encrypted packets; and routing, by a second programmable input/output interface, the plurality of encrypted packets to a common data storage.

The disclosure includes methods and apparatuses which perform the above. Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
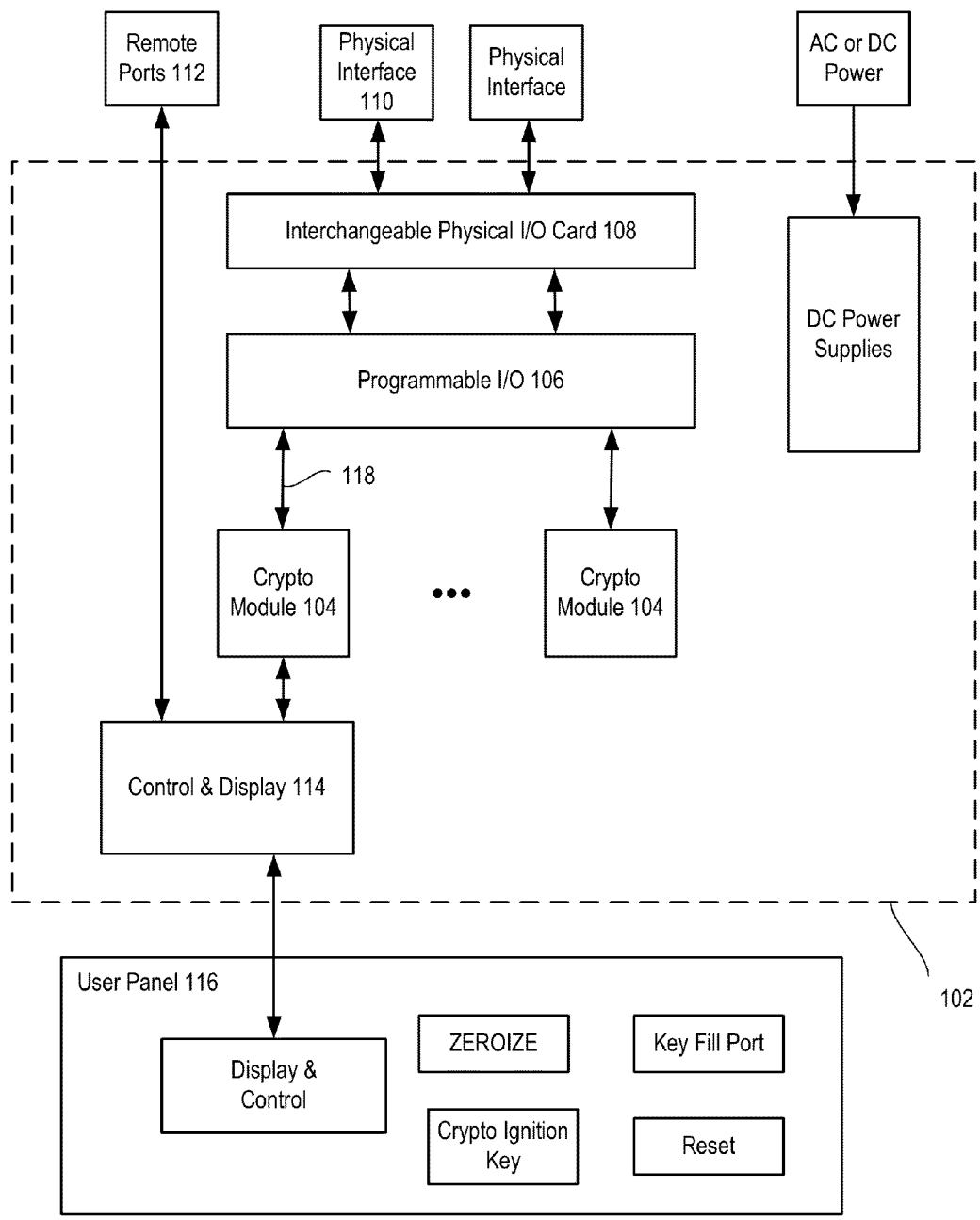
FIG. 1 shows a security processing system including a security device with a plurality of programmable cryptographic modules and a programmable input/output interface, according to one embodiment.

FIG. 1 shows a security processing system including a security device 102 with a plurality of programmable cryptographic modules 104 and a programmable input/output interface 106, according to one embodiment. An interchangeable physical interface 108 is configured to receive a plurality of incoming packets from a data source (e.g., through physical interface 110). In one embodiment, the plurality of cryptographic modules is configured using at least two systolic layers for processing of packets, control data, and keys as discussed further below.

Programmable input/output interface 106 is coupled to the interchangeable physical interface and is configured to route each of the plurality of incoming packets to one of the cryptographic modules 104 for encryption to provide a plurality of encrypted packets. The programmable input/output interface 106 is configured to route the encrypted packets to a common internal or external data storage.

For outgoing packets, programmable input/output interface 106 routes encrypted packets to one of the cryptographic modules 104 for decryption. The decrypted packets are then routed by programmable input/output interface 106 to the data source.

In one embodiment, programmable input/output interface 106 is programmable to support different interface protocols, and each of the plurality of cryptographic modules 104 is programmable to support different encryption protocols (e.g., each module 104 may be programmed to support a different protocol). Programmable input/output interface 106 may include one or more field-programmable gate arrays that are programmable to support the different interface protocols. In one embodiment, programmable input/output interface 106 may be coupled to the cryptographic modules 104 by a high-speed bus such as, for example, a PCI-e bus.

In one embodiment, the interchangeable physical interface 108 is configurable to support two different physical interfaces. In one example, the interchangeable physical interface 108 comprises a replaceable physical input/output panel (or card) that can be replaced independently of the programmable input/output interface 106 and the plurality of cryptographic modules 104.

FIG. 1 also illustrates a control and display unit 114 coupled to control operation of cryptographic modules 104, and also to send or receive data over remote ports 112. Remote ports 112 may be, for example, RS-232, USB, or GigEthernet ports. Remote ports 112 may implement communications using, for example, an SNMP protocol.

Control and display unit 114 provides drivers to a display and status control screen on the user panel 116. User panel 116 also provides soft or hard buttons for user control and data input during the operation of security device 102. Various functions controllable on user panel 116 include a zeroize control (to zeroize the keys), a crypto ignition key (to start the encryption process), a key fill port (to load the keys), and a system reset.

In one embodiment, security device 102 (which may be, e.g., implemented as a security appliance) is used to prevent data breaches by a hacker trying to gain access to encrypted data. In this embodiment, security device 102 provides security, encryption, high-assurance, high-availability sustained bandwidths up to 400 Gbs (full duplex), programmability for data-at-rest and in-network applications. The security device 102 has an interchangeable I/O flexible module as described above to support different physical (PHY) interface connectors and electronics.

In one embodiment, use of the interchangeable I/O interface 108 and programmable I/O interface 106 (implemented using an FPGA I/O systolic array) provides the following advantages:

1) The FPGA I/O systolic array can be programmed for different interfaces and the interchangeable I/O is designed with the selected interface's physical electronics and connectors. This permits the main physical chassis of security device 102 to remain unchanged and to readily use different interface options that can be changed by a user.

2) The security device architecture in conjunction with the interchangeable I/O provides a high-density connectors capability. These flexible I/O design features can be programmed for many different types of interfaces to maximize interfacing flexibility to an end network application.

3) Scalable performance in programmable specified data rate increments for each cryptographic module up to, e.g., six modules which will have up to six times the programmed full duplex data rates. Other lesser or greater numbers of cryptographic modules may be used in other designs.

In one embodiment, flexible I/Os and flexible cryptographic (sometimes simply referred to as "crypto" herein) modules are accomplished by using a scalable systolic architecture and crypto-modules and interchangeable input/output (I/O) card, as described herein. The security device 102 has programmable delay latencies for a specified data block size of programmable bytes sizes. The security device architecture has two programmable elements: the programmable crypto-module and the programmable flexible I/O.

In one embodiment, the flexible I/O has two components: The FPGAs can be programmed to support different interface protocols, and an interchangeable physical I/O card is used to support the physical interfaces and connectors. The flexible I/O also has a switching network. The scalable and programmable crypto-module has a programmable full duplex bandwidth consisting of high performance CPUs and FPGAs clocking up to maximum allowable clock rates internal to the FPGA. This CPU and FPGA in systolic-matrix configuration and implementation provides a fully-programmable system to meet many different applications.

In one embodiment, the security device crypto-module design will be using high performance CPU or equivalent processors and FPGAs forming a programmable systolic scalable module. The programmability efficiencies of design are realized by segmenting functional subsystems from packet engines, crypto engines, key handler and overhead-control management engines. The I/O interface incorporates functional blocks (e.g., 100 Gbs Ethernet, PCI-express, Fibre channel, SAS, Infiniband, SCSI, or any other high speed interface protocols) that are incorporated.

In one embodiment, the security device 102 can be both a media-level encryptor and a file system encryptor. All data payload passing thru security device 102 is encrypted except for the file system headers-commands (which remain in the clear). Therefore, the existing file system will be intact with no drivers required for the end system. The only interface required is for the end system remote management and key management products. This makes the security device transparent to a user or network storage system.

Figure 2:
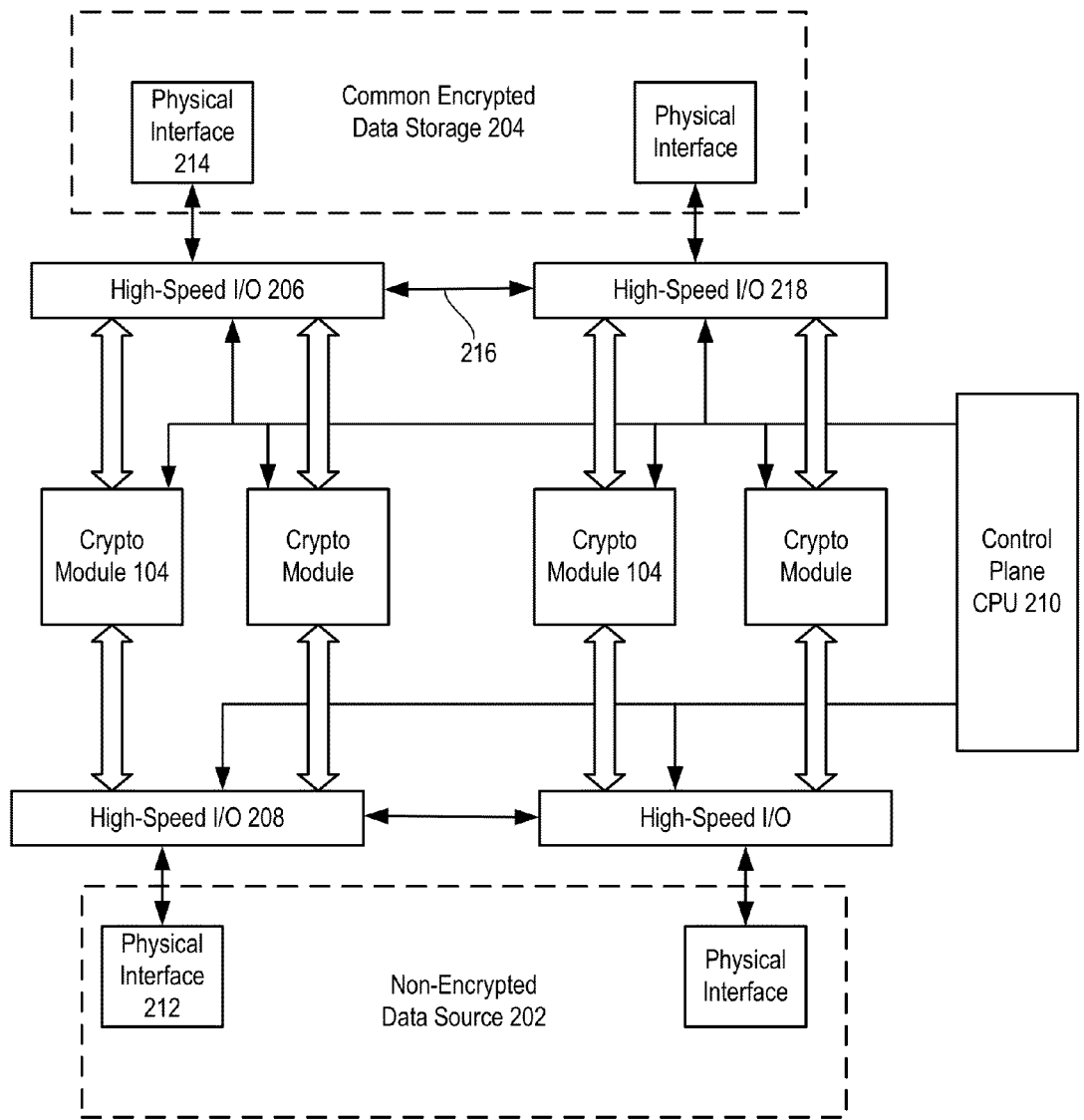
FIG. 2 shows a systolic-matrix security processing system for receiving and encrypting data packets from a non-encrypted data source, and concurrently processing control and data from a control plane for storage in a common encrypted data storage, according to one embodiment.

FIG. 2 shows a security processing system for receiving and encrypting data packets from a non-encrypted data source 202 for storage in a common encrypted data storage 204, according to one embodiment. The system includes cryptographic modules 104. Each cryptographic module is coupled between programmable high-speed input/output (I/O) interfaces 206 and 208, which are each coupled to an interchangeable physical interface (see, e.g., interface 108 in FIG. 1). In one embodiment, interfaces 206 and 218 communicate with each other during security data processing using, for example, a serial bus 216 (e.g., an Interbus serial bus).

Processor 210 handles control plane and data processing for the cryptographic modules 104 and the high-speed input/output interfaces 206, 208, 218. In one embodiment, processor 210 is a control plane processor configured to control systolic data flow for the cryptographic modules 104, and also to control loading of keys from an external key manager to an internal key cache (see, e.g., FIG. 9 below).

Physical interface 212 receives a plurality of incoming packets from data source 202. The first programmable high-speed input/output interface 208 routes each of the plurality of incoming packets to one of the cryptographic modules 104 for encryption processing to provide encrypted packets. The second programmable high-speed programmable input/output interface 206 routes the encrypted packets from the cryptographic module 104 to common encrypted data storage 204 via physical interface 214.

In one embodiment, the routing and switching functions of high-speed interfaces 206 and 208 are provided by programmable input/output interface 106 of FIG. 1. In one embodiment interchangeable physical input/output interface 108 includes physical interface 212 and/or 214.

In one embodiment, each of the encrypted packets has a respective tag to identify an original entry port (e.g., a port of high-speed I/O interface 208), keys or key addresses associated with each of the encrypted packets is decrypted by one of the cryptographic modules to provide corresponding decrypted packets, and the first programmable input/output interface 208 is further configured to use the respective tag to route each decrypted packet back to its original entry port.

In one embodiment, each programmable input/output interface 206, 208, 218 is programmable to support different interface protocols. For example, the first programmable input/output interface 208 may include a plurality of field-programmable gate arrays that are programmable to support the different interface protocols.

In one embodiment, the first programmable input/output interface 208 and the second programmable input/output interface 206 each comprise a switching network and a router (not shown) to route incoming packets (from data source 202 or data storage 204, respectively) to one of the cryptographic modules 104.

In one embodiment, each cryptographic module 104 is designed and programmed, and mathematically optimized for any cryptographic algorithms and network IP protocols. The design can be scaled up to, for example, six or more crypto modules. The security device 102 can be mathematically optimized, for example, for any cryptographic algorithms for full-duplex data rate performance.

In one embodiment, the security device architecture is adaptable to any enterprise class data-at-rest or IP network solution due to the flexible switching I/O architecture. The flexible input and output switching I/O interfaces provide a significant cost advantage and homogeneous data flow and relax the need for data separation. The security device may use FPGAs that bridge to the native I/O interface for the required number of crypto-modules. This allows a single crypto-module to be used with many possible system implementations and configurations based on the end application I/O type and throughput requirements and also be scalable with programmable data rate increments.

In one embodiment, the flexible switch I/O architecture described herein includes programmable I/O modules (using FPGAs) that function as a low latency bridge and switch between the native I/O to the target data-at-rest system and to the internal array of crypto-module processors. A pair of separated, designated programmable FPGA-based I/O interface modules bridges security device 102 to an industry standard network. This scalability and flexibility enables security device 102 to be inserted into existing or new storage network systems supporting scalable data rates.

In one embodiment, the flexible programmable I/O interface is adaptable to any enterprise, or mobile, class data-at-rest interface application. The flexible I/O architecture includes programmable I/O modules (using FPGAs) that function as a low latency bridge between the native I/O of the target data-at-rest system and the internal array of crypto-modules. Flexible I/O programmability is based on FPGA-based modules that can be programmed to any industry standards or a custom interface to the storage system fabric or IP network.

In one embodiment, security device 102 performs at data rates only limited by the technology used. The key-handling agility is matched to the data rates. The internal key management is central to the performance of the cryptographic module in this embodiment.

Figure 3:
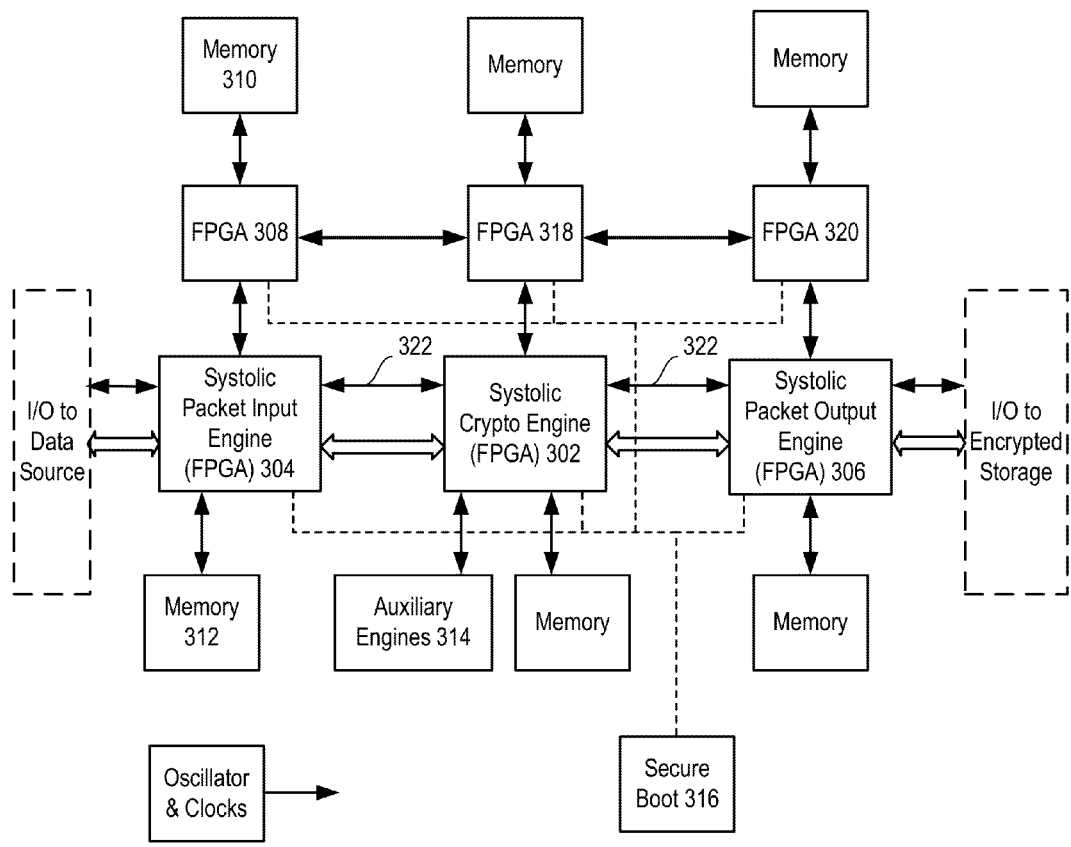
FIG. 3 shows a systolic-matrix cryptographic module including programmable input and output packet engines and a programmable cryptographic processing engine, according to one embodiment.

FIG. 3 shows a cryptographic module 104 including programmable input and output packet engines and a programmable cryptographic processing engine, according to one embodiment. More specifically, cryptographic module 104 comprises a programmable packet input engine 304, a programmable cryptographic engine 302, and a programmable packet output engine 306. In one embodiment, packet engines 304 and 306 are coupled to cryptographic engine 302 using a high-speed serial or parallel bus 322 (e.g., an Interbus bus) for control operations, and using high-speed data busses for data transfer.

In one embodiment, the programmable packet input engine 304, the programmable cryptographic engine 302, and the programmable packet output engine 306 are each configured as a systolic-matrix array and each include one or more field-programmable gate arrays (FPGAs) programmable to support different security protocols. In one example, the programmable packet input engine 304, the programmable cryptographic engine 302, and the programmable packet output engine 306 are each coupled to a respective dedicated program memory for each FPGA (e.g., memory 310 or 312), and to a respective dedicated processor (not shown) to control programming of each FPGA. Each memory 310, 312 may be used, e.g., to provide data, keys buffering and/or storage.

In a method according to one embodiment, the first programmable input/output interface 208 (see FIG. 2) includes a field-programmable gate array (FPGA), and the method includes programming the FPGA to support a different interface protocol than previously used for receiving incoming data packets. In this method, each of the plurality of cryptographic modules 104 includes programmable systolic packet input engine 304, programmable systolic-matrix cryptographic engine 302, and programmable systolic-matrix packet output engine 306. The method further includes programming an FPGA of the packet input engine 304, an FPGA of the cryptographic engine 302, and an FPGA of the packet output engine 306.

In one embodiment, a top systolic layer includes FPGAs 308, 318, and 320, which are coupled to systolic packet engines 304, 306 and cryptographic engine 302, each also including an FPGA, in order to form a two-dimensional systolic-matrix array for data and control processing.

In one embodiment, each crypto module 104 has input and output packet engines and the crypto core. The crypto module has a systolic crypto engine that is tightly coupled to the input and output systolic packet engines. Each element in the crypto module has a dedicated high-performance CPU plus its memory, and dedicated memory to the input-output systolic packet engines and crypto core buffer/storage memory.

In one embodiment, each FPGA(s) array has a dedicated program memory. Also, a compression engine (included, e.g., in auxiliary engines 314) is included for data compression or other data processing required.

In one embodiment, the crypto module of FIG. 3 uses secure boot 316 to verify the FPGA code and that any software (SW) within the crypto module is encrypted-secure and authenticated. During the secure boot process, if any anomalies are detected, the system will not boot and further may provide a user alert that issues have been detected. The secure boot 316 may be designed to work with existing industry key manager systems.

In one embodiment, the crypto module design of FIG. 3 provides features such as hard-wired, one-time programmable options and custom analog/digital circuits for flexible physical partitioning for un-encrypted (plain text) and encrypted (cipher text) separation.

Figure 4:
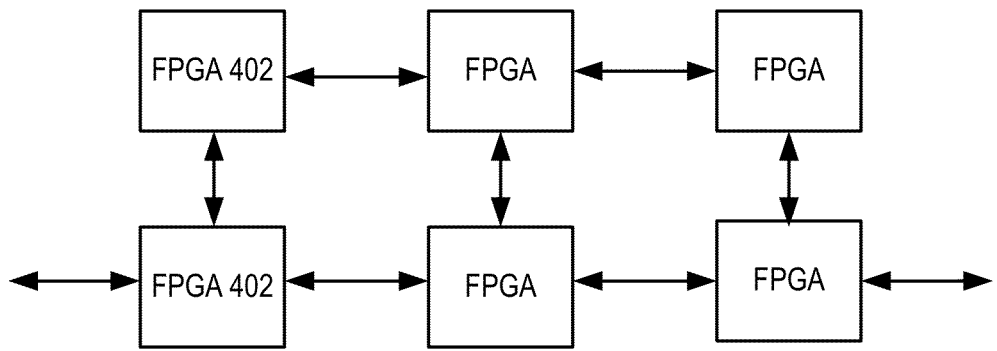
FIGS. 4 and 5 each show an example of a systolic-matrix array with two-dimensional computing paths, according to various embodiments.
Figure 5:
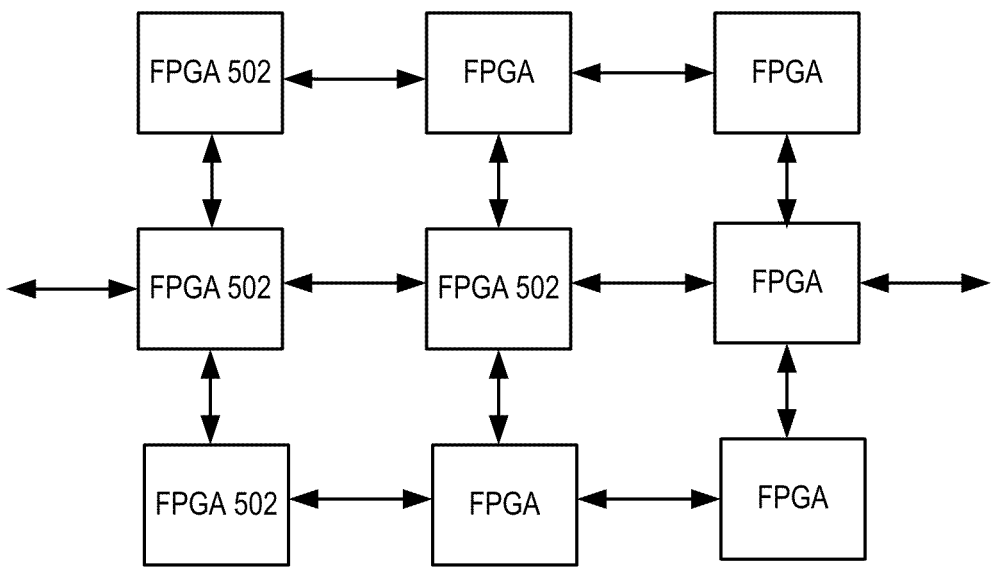

FIGS. 4 and 5 each show an example of a systolic-matrix array with two-dimensional computing paths, according to various embodiments. FIG. 4 shows FPGAs 402 organized in a systolic-matrix array for data, keys and control processing of security packets. Although FPGAs are shown forming the systolic-matrix array in FIG. 4, other forms of programmable devices, or other types of data processing units or processors may be used to form the systolic-matrix array in other embodiments (e.g., ASICs may be used). FIG. 5 shows an alternative configuration for systolic-matrix array comprising FPGAs 502 for data control processing of security packets.

In one embodiment, each cryptographic module 104 is implemented using a systolic-matrix array configuration. For example, cryptographic module 104 as illustrated in FIG. 3 is configured in a systolic-matrix array such as the basic form illustrated in FIG. 4. In addition, in one embodiment, the input and output packet engines 304, 306 and/or the cryptographic processing engine 302 for each cryptographic module 104 are also each themselves designed with an internal systolic-matrix array architecture. For example, the cryptographic processing engine 302 may be configured in a systolic-matrix array configuration such as illustrated in FIG. 5. In another example, each packet engine may itself have the systolic array configuration of FIG. 4 or FIG. 5, or yet other systolic array configurations, as part of its internal sub-block processing architecture.

Thus, as described above, in some embodiments, security device 102 is configured with a two or greater multiple-layer systolic-matrix array architecture. In this architecture, each cryptographic module 104 has a systolic-matrix array configuration (i.e., a top systolic array layer), and each of the packet engines and/or cryptographic processing engine has an internal systolic-matrix array configuration (e.g., in a lower systolic array layer formed of FPGAs that is logically underneath the top systolic-matrix array layer). The multiple-layers above combined with two-dimensional systolic arrays provides a three-dimensional systolic-matrix architecture for security device 102.

Figure 6:
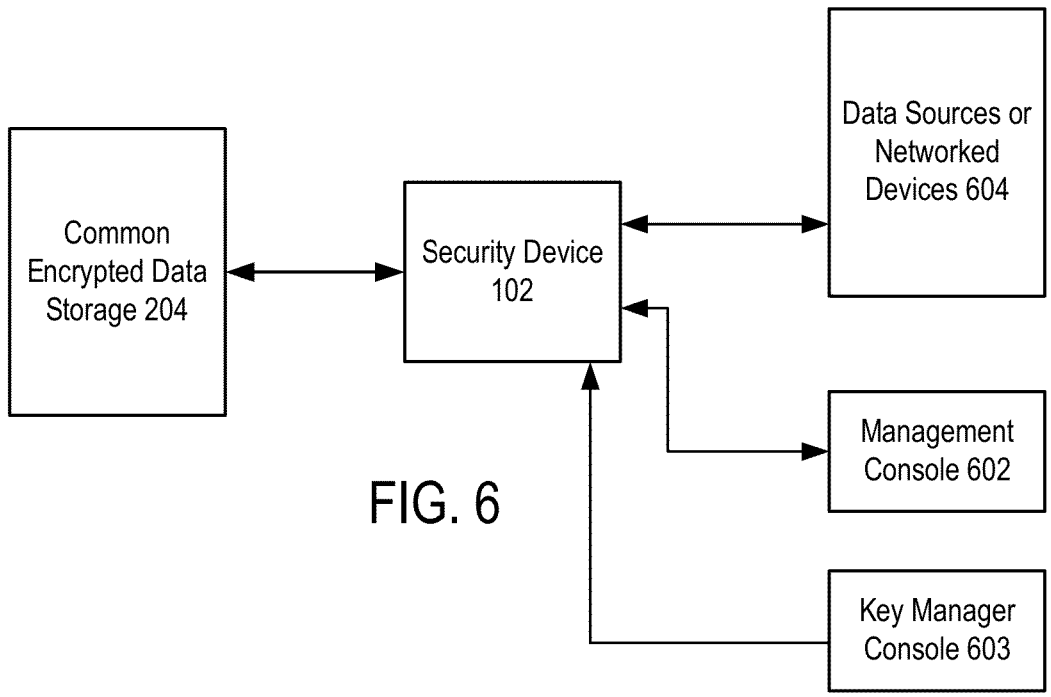
FIG. 6 shows a security device implemented between a data source and encrypted data storage using an in-line configuration, according to one embodiment.

FIG. 6 shows security device 102 implemented between a data source 604 and encrypted data storage 204 using an in-line configuration, according to one embodiment. In one example, security device 102 is installed as an enterprise high-performance data storage encryption and authentication appliance. The security device is installed as in-line (bump in the wire) between the data storage arrays. Security device 102 also interfaces with management console 602 and external key manager console 603.

Figure 7:
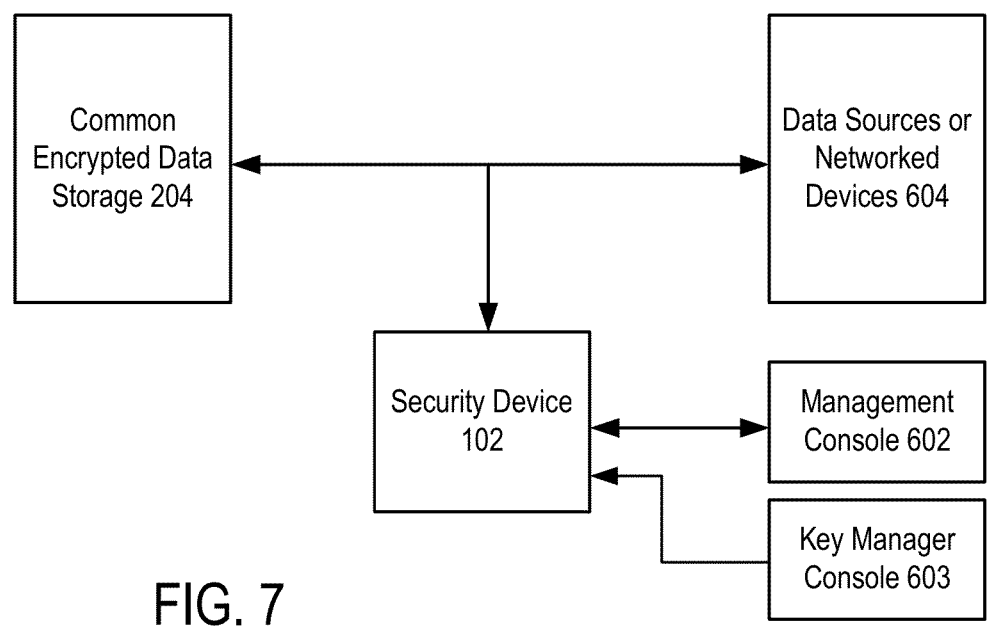
FIG. 7 shows a security device implemented between a data source and encrypted data storage using a side-car configuration, according to one embodiment.

FIG. 7 shows security device 102 implemented between data source 604 and encrypted data storage 204 using a side-car configuration, according to one embodiment. In one example, security device 102 is installed as a data storage encryption and authentication appliance as side car (off to the side of the data storage). Security device 102 also interfaces with management console 602 and external key manager console 603.

Figure 8:
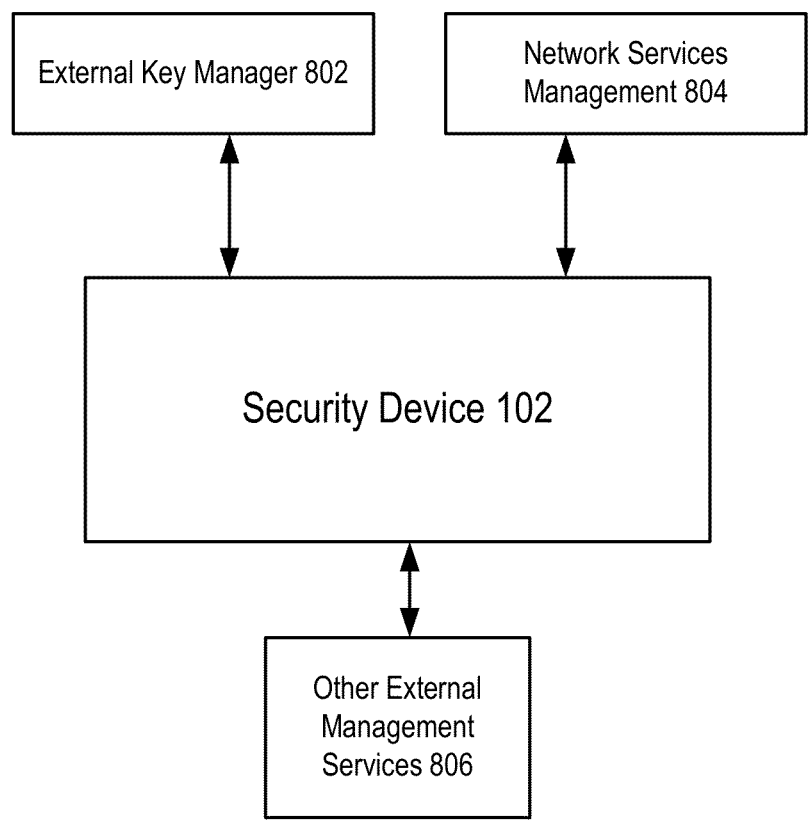
FIG. 8 shows a security device interfacing with external and network services, according to one embodiment.

FIG. 8 shows security device 102 interfacing with external and network services, according to one embodiment. In particular, security device 102 is interfaced with a management console consisting of external key manager 802, network services management 804, and any other required external management services 806.

Figure 9:
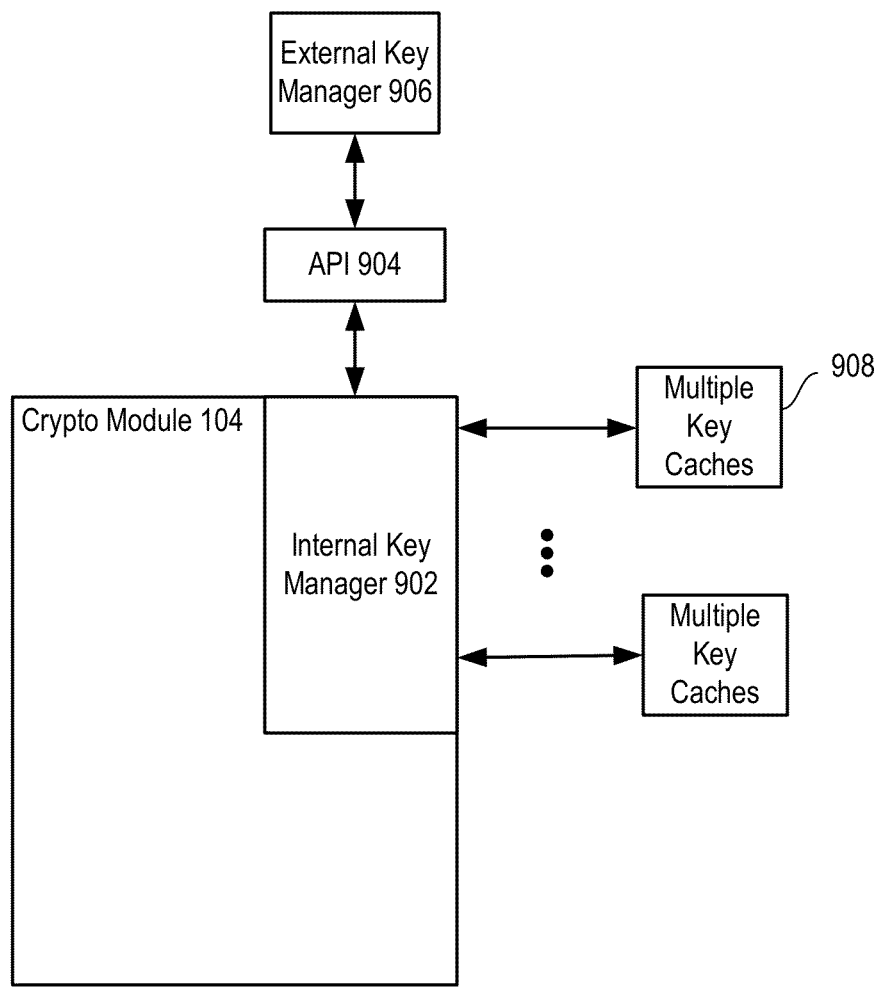
FIG. 9 shows an internal key manager of the cryptographic module that communicates with an external key manager via an application programming interface, according to one embodiment.

FIG. 9 shows an internal key manager 902 of cryptographic module 104 that communicates with an external key manager 906, according to one embodiment. Each of the plurality of cryptographic modules 104 comprises internal key manager 902, which is coupled via an application programming interface (API) 904 to external key manager 906. Keys received via API 904 are stored in one of multiple key caches 908 for use by the cryptographic modules 104 during encryption or decryption of incoming packets. In one embodiment, control plane processor 210 controls loading of the keys from API 904 to one of key caches 908.

In one embodiment, each of the incoming packets to a cryptographic module 104 includes a key tag to identify at least one key associated with the packet to be security processed, and further may also include a source tag to identify a data source and keys for the packet. The internal key manager 902 is configured to retrieve the keys from one of key caches 908 using the key tag for the packet to be processed by the respective cryptographic module 104.

In one embodiment, programmable input/output interface 106, 206, and/or 208 is further configured to route a packet to one of the plurality of cryptographic modules 104 based on the source tag.

In one embodiment, each of the plurality of cryptographic modules 104 may be physically partitioned from the other of the cryptographic modules. In one embodiment, other key features of security device 102 may include the ability to interface or port third party key management software and network management software.

Various additional, non-limiting embodiments of security device 102 are now described below. In one or more embodiments, security device 102 may provide one or more of the following advantages:

1. A fast data rate encryptor at hundreds of gigabits full duplex (e.g., for meeting future optical network data rates).

2. A programmable systolic architecture consisting of FPGAs and CPUs. The security device is flexible and programmable requiring only software upgrades for different versions and features.

3. Multi-tenancy to secure individual user's data. Each user's data will be encrypted/decrypted using a unique key per the user. In this way, each user's data will be uniquely encrypted/decrypted and stored in a common data storage area. If by operator or machine error the wrong data is accessed and mistakenly sent to another user, the data is still safe since it is not decrypted by the correct user key.

4. A multi-level security architecture to secure different levels of classified data using a single encryptor. Each classification of data will be encrypted/decrypted using a unique key per the data class. In this way, each classification of data will be uniquely encrypted/decrypted and stored in a common storage area. If by operator or machine error the wrong data is accessed and mistakenly sent to another level of classification, the data is still safe since it is not decrypted by the correct user key.

5. A high-speed key agility and storage for millions of keys.

6. A flexible high-density I/O to interface to network equipment at multiple customer (or other source) sites. Also, the flexible I/O can be programmed for mixed interface types (e.g., 10 Gbs Ethernet, Infiniband, or PCI-express), thus requiring no interface bridging network equipment.

7. A replaceable, flexible I/O physical panel that can be customized for a specific network installation without the need to re-design the main chassis of security device 102.

8. A secure boot to protect, authenticate the CPUs, FPGAs firmware and software (SW) codes.

Figure 10:
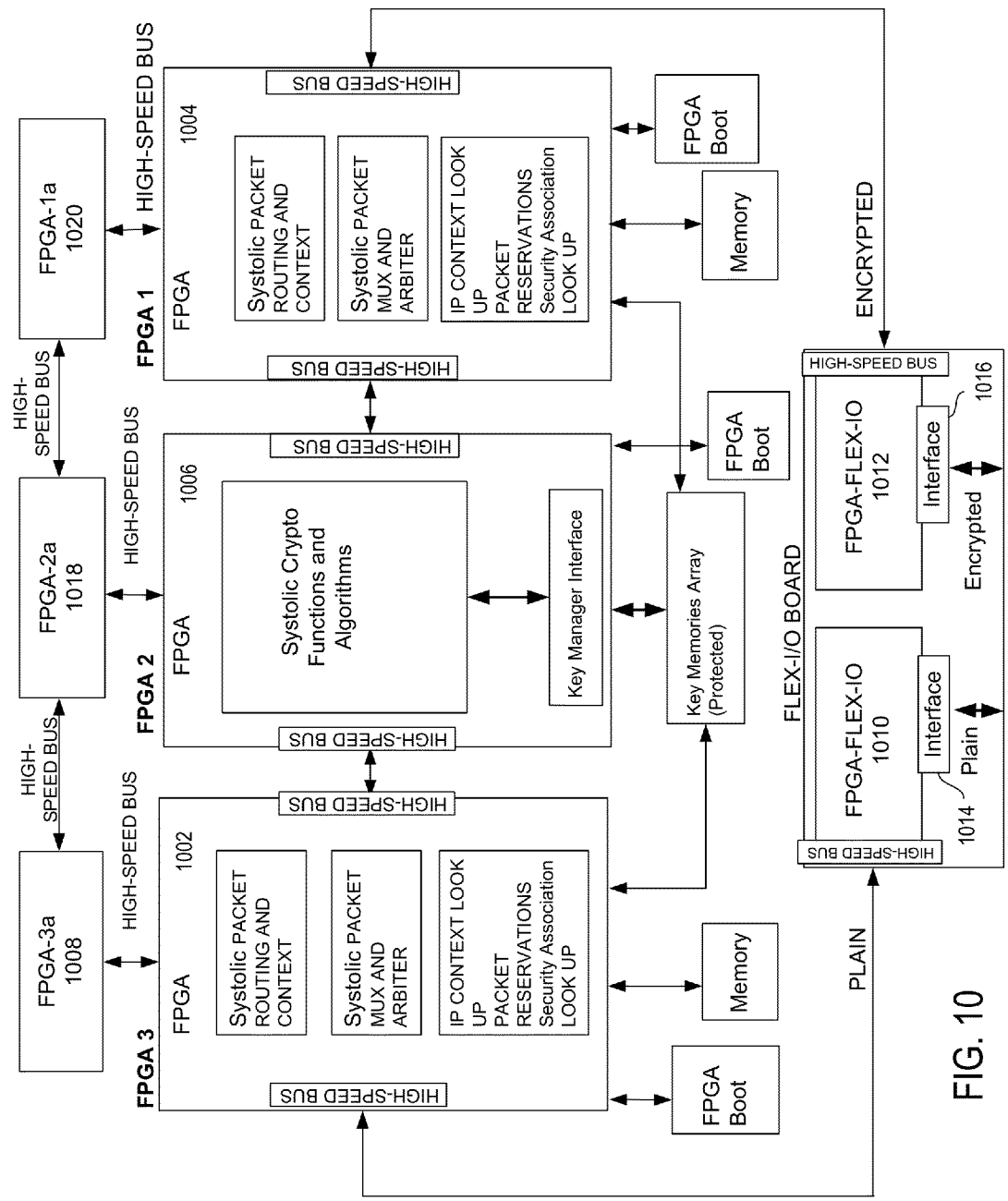
FIG. 10 shows a specific implementation of a programmable cryptographic module configured as a systolic array of FPGAs, according to one embodiment.

FIG. 10 shows a specific implementation of a programmable cryptographic module configured as a systolic-matrix array of FPGAs, according to one embodiment. In particular, the system of FIG. 10 is an exemplary implementation of cryptographic module 104 as was discussed for FIG. 3 above.

Specifically, un-encrypted or plain text data (e.g., incoming data packets) enters physical interface 1014 and is routed by programmable input interface 1010 to packet input engine 1002. Data packets are routed by input engine 1002 to an appropriate cryptographic core in cryptographic processing engine 1006.

A security association (SA) key lookup is used in packet engine 1002 or 1004 to determine appropriate keys for loading from a key memories array to cryptographic engine 1006 via a key manager interface or as defined in the packet header. These keys are used for security processing of the corresponding data packet.

After encryption by processing engine 1006, encrypted packets are provided to packet output engine 1004 for routing to programmable output interface 1012. The encrypted data leaves via physical interface 1016.

Programmable interfaces 1010 and 1012 may be formed using FPGAs or other programmable devices (e.g., as described above for I/O interfaces 106 or 208 of FIGS. 1 and 2). In one embodiment, physical interfaces 1014 and 1016 may form a part of interchangeable physical input/output interface 108. In one embodiment, physical interface 108 is implemented as a removable physical card.

In one embodiment, FPGAs 1008, 1018, and 1020 form a portion of the systolic-matrix array configuration illustrated in FIG. 10 and may be coupled to the packet input and output engines and cryptographic processing engine using serial buses. The packet input and output engines and cryptographic engine are formed using FPGAs to provide a two-dimensional systolic array of a top systolic layer. In one example, data and control processing is performed in two dimensions using the six FPGA units (e.g., FPGA 1008 and packet input engine 1002) as illustrated in FIG. 10.

In one embodiment, the sub-blocks in the packet input engine 1002 or packet output engine 1004 such as packet routing, packet multiplexer, and IP context lookup are implemented in a systolic-matrix array configuration as was discussed above. Data comes into the packet engine, and the packet engine looks at the packets, including the context, and decides where to route each packet. Then, the packet engine determines that a packet requires a particular security association, which is implemented using a key lookup. The packet engine associates the key to the incoming data. The key is read out, and the data is encrypted or decrypted in one of the crypto cores.

In one embodiment, high-speed memory is coupled to the input and output packet engines, and may be any type of high-speed memory in various embodiments.

In one embodiment, all primary processing works in a matrix. Data is constantly flowing in two dimensions. For example, data is flowing horizontally, keys are flowing up vertically, and control information is flowing down vertically as part of the two-dimensional processing.

Variations

Additional variations, details, and examples for various non-limiting embodiments are now discussed below. In a first variation, with reference to FIG. 1, the programmable input/output interface 106 is a router/switch that selects one of the crypto modules 104 to receive forwarded packets. A router and switch are incorporated inside the input/output interface 106. For example, if a first packet comes through a second port, the first packet will be routed to crypto module number six. Crypto module number six will later route the first packet back out through that same second port of original entry.

There may be two components to the programmable I/O interface. On one side, the interface programs the type of I/O that is desired. The other side of the interface is the router/switch. The router/switch multiplexer knows which crypto module 104 is to receive a given packet. Also, the router/switch knows which crypto module is ready for processing of a packet. For example, if crypto module number one is ready for processing, it will flag itself as being ready for processing. For example, there is a semaphore flag or packet header bits used that tells I/O interface 106 which module is ready to process data. Whatever port is used to bring in the data, that data will be processed in one of the crypto modules, and then tagged out back to the same port when later being decrypted and sent out from storage (e.g., the packet is tagged with some identification of the port using a tag). The tag is used to redirect the packet back to the correct port of original entry.

The crypto module has a security association that determines which keys go with which packet. The programmable input/output may allow programming of different applications because of the use of FPGAs. The back end of the router/switch will accommodate the type of input/output to be used. The router/switch will identify the crypto module to be used. When reprogramming the programmable interface 106, a new physical interface needs to be interchanged or installed. The main security device chassis is not changed out—only the I/O portion is being changed.

In one embodiment, remote ports 112 are basically control ports. The protocol for the remote port may typically be a Simple Network Management Protocol (SNMP) protocol or any other management protocols The key fill port is where the keys are filled into the security device. The crypto ignition key ignites the security device.

With reference to FIG. 2, the Interbus serial bus (mentioned above) coordinates the operation of the two input/output interfaces 206, 218. The Interbus handles any protocol issues between the router and the switch functions of these interfaces. The Interbus is used to provide communication between the FPGAs of the systolic array during operation of the security device. In one example, the Interbus helps to coordinate operation as to which crypto module 104 will receive an incoming packet.

Processor 210 manages control plane operation. Processor 210 also configures components when a new security protocol will be used, uses routing tables, sets the configuration, sets up the programmability, and sets up the power-on self-test. Processor 210 also may facilitate key loading. The key fill port on the front of user panel 116 operates under control by processor 210.

With reference to FIG. 3, a secure boot is used to guarantee that the data booted into the FPGAs of the cryptographic module 104 is proper. The secure boot is executed when the unit is turned on or at boot-up. The code is authenticated by the system. The FPGAs are programmed at every boot up of the unit, or any time that the unit is reset. Each crypto module may have its own CPU which controls programming.

With reference to FIG. 8, external key management 802 is a location that the keys may be stored for passing to the security device 102. A network operator loads the keys into the external key management 802. The security device 102 loads the keys into the crypto modules. There is key tagging in the packet headers and inside the crypto module. When a packet comes into the security device 102, the packet is associated with a given key, and the packet contains information used to route the packet. The external key management can load keys in real-time or only a single time. Network services management 804 is remote management which provides control status, setting-up of the security device unit, and sending of the status back to a user. The other external management services 806 could be used to track how many other units are in the field, what the units are doing, whether each unit is running, and what configuration the unit is in.

In one embodiment, data packets include key tags, customer tags, and packet tags. The packet tag tells what type of packet is coming in. The customer tag identifies the company or source of the data. The key tag tells what key goes with what packet. Each tag is looked at by the packet engine to determine how the packet is going to be routed within the crypto module 104.

Now discussing an embodiment regarding flexible physical partitioning, each cryptographic module 104 may be physically isolated by design. So, only a certain packet will go through a module number one and only certain other packets will go through module number two. For example, crypto module number one may only process a certain style of packet. Crypto module number two may only process packets for a particular customer. Thus, it is physically partitioned. For example, customer number one's data is tagged as belonging to customer number one, for sending it to the specific crypto module. The router determines this requirement, and only that particular crypto module can process that customer's packet.

Regarding internal key management in the crypto module's performance, the key manager loads the keys, and further decides how the keys are dispersed within the crypto module based on the tagging of the incoming data packet. Keys are stored in the selectable key cache 908. The key manager decides based on the tagging of the data packet what keys will be associated with the current packet. This provides key agility.

With reference to FIG. 9, API 904 may be programmed to map into any of several different external key managers 906. The use of API 904 thus provides increased flexibility.

Closing

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings may illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that various stages or components could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
  a plurality of cryptographic computing devices, each cryptographic device comprising at least one processor and at least one memory, each cryptographic device configured to perform security processing, and each cryptographic device comprising a programmable systolic packet input engine, a programmable systolic cryptographic engine, and a programmable systolic packet output engine;
  wherein the packet input engine, the cryptographic engine, and the packet output engine each are configured as a systolic-matrix array and include a respective field-programmable gate array (FPGA);

wherein the packet input engine comprises a systolic array configured for packet routing, and the cryptographic engine comprises a systolic array configured for cryptographic functions;

each cryptographic device further comprising a plurality of additional FPGAs configured as a top layer in a two-dimensional systolic array to support the security processing, wherein a first FPGA of the additional FPGAs is coupled to the packet input engine, a second FPGA of the additional FPGAs is coupled to the cryptographic engine, and a third FPGA of the additional FPGAs is coupled to the packet output engine;

an interchangeable physical interface configured to receive a plurality of incoming packets from a data source;

a first programmable input/output interface, comprising an FPGA, coupled to the interchangeable physical interface, configured to route each of the plurality of incoming packets to one of the cryptographic devices for encryption to provide a plurality of encrypted packets; and a second programmable input/output interface, comprising an FPGA, configured to route the encrypted packets to a common data storage.

2. The system of claim 1, wherein each of the encrypted packets has a respective tag to identify an entry port, each of the encrypted packets is decrypted by one of the cryptographic devices to provide corresponding decrypted packets, and the first programmable input/output interface is further configured to use the respective tag to route each decrypted packet to the entry port of its corresponding encrypted packet.

3. The system of claim 1, wherein the second programmable input/output interface is the first programmable input/output interface.

4. The system of claim 1, wherein the first programmable input/output interface is programmable to support different interface protocols, and each of the plurality of cryptographic devices is programmable to support different encryption protocols.

5. The system of claim 1, wherein the interchangeable physical interface is configurable to support two different physical interfaces.

6. The system of claim 5, wherein the interchangeable physical interface comprises a replaceable physical input/output panel that can be replaced independently of the first programmable input/output interface and the plurality of cryptographic devices.

7. The system of claim 1, wherein the FPGA of the cryptographic engine is programmable to support different security protocols.

8. The system of claim 7, wherein the packet input engine, the cryptographic engine, and the packet output engine are each coupled to a respective dedicated program memory for the respective FPGA, and to a respective dedicated processor to control programming of the respective FPGA.

9. The system of claim 1, wherein the FPGA of the first programmable input/output interface is programmable to support different interface protocols.

10. The system of claim 1, wherein the first programmable input/output interface and the second programmable input/output interface each comprise a switching network and a router to route incoming packets to one of the cryptographic devices.

11. The system of claim 1, wherein each of the plurality of cryptographic devices comprises an internal key manager coupled via an application program interface (API) to an external key manager, and wherein keys received via the API are stored in a key cache for use by the cryptographic devices during encryption of incoming packets.

12. The system of claim 11, further comprising a control plane processor configured to control systolic data flow for the cryptographic devices, and to control loading of the keys from the API to the key cache.

13. The system of claim 11, wherein each of the incoming packets includes a key tag to identify at least one key associated with the packet, and further includes a source tag to identify a data source for the packet, and wherein the internal key manager is configured to retrieve the keys from the key cache using the key tag for a packet to be processed by the respective cryptographic device.

14. The system of claim 13, wherein the first programmable input/output interface is further configured to route an incoming packet to one of the plurality of cryptographic devices based on the source tag, and wherein each of the plurality of cryptographic devices is physically partitioned from the other of the cryptographic devices.

15. The system of claim 1, wherein the plurality of cryptographic devices is configured using at least two systolic layers for processing of packets.

16. A method, comprising:
receiving, by an interchangeable physical interface, a plurality of incoming packets from a data source;
routing, by a first programmable input/output interface coupled to the interchangeable physical interface, the plurality of incoming packets to a first device of a plurality of cryptographic computing devices, each cryptographic device comprising at least one processor and at least one memory, each cryptographic device configured to perform security processing, and each cryptographic device comprising a programmable systolic packet input engine, a programmable systolic cryptographic engine, and a programmable systolic packet output engine;
wherein the packet input engine, the cryptographic engine, and the packet output engine each are configured as a systolic-matrix array and include a respective field-programmable gate array (FPGA);
wherein the packet input engine comprises a systolic array configured for packet routing, and the cryptographic engine comprises a systolic array configured for cryptographic functions;
each cryptographic device further comprising a plurality of additional FPGAs configured as a top layer in a two-dimensional systolic array to support the security processing, wherein a first FPGA of the additional FPGAs is coupled to the packet input engine, a second FPGA of the additional FPGAs is coupled to the cryptographic engine, and a third FPGA of the additional FPGAs is coupled to the packet output engine;
encrypting the incoming packets using the first device to provide a plurality of encrypted packets; and
routing, by a second programmable input/output interface, the plurality of encrypted packets to a common data storage.

17. The method of claim 16, wherein:
the first programmable input/output interface comprises a fourth FPGA, the method further comprising programming the fourth FPGA to support a different interface protocol; and
the method further comprising programming the FPGA of the packet input engine, the FPGA of the cryptographic engine, and the FPGA of the packet output engine.

18. A system, comprising:
a plurality of cryptographic computing devices, each cryptographic device comprising at least one processor and at least one memory, each cryptographic device configured to perform security processing, and each cryptographic device comprising a programmable systolic packet input engine, a programmable systolic cryptographic engine, and a programmable systolic packet output engine;

wherein the packet input engine, the cryptographic engine, and the packet output engine each are configured as a systolic-matrix array and include a field-programmable gate array (FPGA);

wherein the packet input engine comprises a systolic array configured for packet routing, and the cryptographic engine comprises a systolic array configured for cryptographic functions;

each cryptographic device further comprising a plurality of additional FPGAs configured as a top layer in a two-dimensional systolic array to support the security processing, wherein a first FPGA of the additional FPGAs is coupled to the packet input engine, a second FPGA of the additional FPGAs is coupled to the cryptographic engine, and a third FPGA of the additional FPGAs is coupled to the packet output engine;

a first programmable input/output interface, comprising memory, configured to route each of a plurality of incoming packets to one of the cryptographic devices for encryption to provide a plurality of encrypted packets; and a second programmable input/output interface, comprising memory, configured to route the encrypted packets to an internal or external common data storage.

* * * * *